(12) United States Patent
Chen et al.

(10) Patent No.: US 11,406,218 B2
(45) Date of Patent: Aug. 9, 2022

(54) AUTOMATIC POUR OVER COFFEE MAKER

(71) Applicant: EnE Holdings Ltd, Hong Kong (CN)

(72) Inventors: Yuen Chin Andrew Chen, Hong Kong (CN); Wai Ming Raymond Wong, Hong Kong (CN); Tak Fung Dick Leung, Hong Kong (CN); Pui Yin Amy Decem Cheng, Hong Kong (CN); Kok Leong Jeremy Tay, Hong Kong (CN)

(73) Assignee: EnE Holdings Ltd, Hong Kong (CN)

( * ) Notice: Subject to any disclaimer, the term of this patent is extended or adjusted under 35 U.S.C. 154(b) by 338 days.

(21) Appl. No.: 16/572,644

(22) Filed: Sep. 17, 2019

(65) Prior Publication Data

US 2020/0008610 A1    Jan. 9, 2020

Related U.S. Application Data

(63) Continuation-in-part of application No. PCT/IB2018/051768, filed on Mar. 16, 2018, and a continuation-in-part of application No. 15/671,077, filed on Aug. 7, 2017, now Pat. No. 10,820,737, which is a continuation of application No. 14/123,504, filed as application No.
(Continued)

(51) Int. Cl.
*A47J 31/46* (2006.01)
*A47J 31/10* (2006.01)

(52) U.S. Cl.
CPC ............. *A47J 31/46* (2013.01); *A47J 31/10* (2013.01)

(58) Field of Classification Search
CPC .... A47J 31/4475; A47J 31/4478; A47J 31/10; A47J 31/46; A47J 31/103

USPC .......................................................... 99/281
See application file for complete search history.

(56) References Cited

U.S. PATENT DOCUMENTS 3,584,568 A * 6/1971 Hausam .................. A47J 31/54
                                                    99/282
4,029,940 A * 6/1977 Eaton, Jr .............. A47J 31/053
                                                    219/506
(Continued)

FOREIGN PATENT DOCUMENTS

CN        103919467 A      7/2014
CN        105030068 A     11/2015
(Continued)

OTHER PUBLICATIONS

Jun. 27, 2018 PCT International Search Report, International Application No. PCT/IB/2018/051768.
(Continued)

*Primary Examiner* — Ibrahime A Abraham
*Assistant Examiner* — Spencer H. Kirkwood
(74) *Attorney, Agent, or Firm* — Law Offices of Albert Wai-Kit Chan, PLLC

(57) ABSTRACT

This invention provides a coffee maker having a top housing (2) connected to a bottom housing (3) via a plurality of connecting elements (4) such that the top housing is enacted above the bottom housing; a water tank (1) positioned on top of the top housing; a carafe (5) to be placed under the top housing, the carafe has an upper part having a brewing cone (51); and a rotating spout (6) located at the bottom of said top housing and above the carafe for pouring hot water into the carafe.

15 Claims, 17 Drawing Sheets

Related U.S. Application Data

PCT/IB2013/059223 on Oct. 9, 2013, now Pat. No. 9,723,946.

(60) Provisional application No. 62/472,672, filed on Mar. 17, 2017, provisional application No. 61/711,313, filed on Oct. 9, 2012.

(56) References Cited

U.S. PATENT DOCUMENTS

| | | | | |
|---|---|---|---|---|
| 4,779,520 | A | * | 10/1988 | Hauslein ............ A47J 31/00 99/287 |
| 2006/0070969 | A1 | * | 4/2006 | Guevara ............ A47J 41/0077 215/12.1 |
| 2014/0318377 | A1 | | 10/2014 | Chen et al. |
| 2016/0183714 | A1 | * | 6/2016 | Hwang ............ A47J 31/4403 99/285 |

FOREIGN PATENT DOCUMENTS

| | | | | |
|---|---|---|---|---|
| CN | 205031059 | U | | 2/2016 |
| CN | 105640337 | A | | 6/2016 |
| CN | 105662150 | A | | 6/2016 |
| EP | 0278197 | B1 | * | 10/1990 ............ A47J 31/446 |
| JP | 3489189 | B2 | * | 1/2004 |
| KR | 20130022750 | A | | 3/2013 |
| KR | 101269885 | B1 | * | 5/2013 |
| KR | 20150050180 | A | | 5/2015 |

OTHER PUBLICATIONS

Jun. 27, 2018 PCT Written Opinion of the International Searching Authority, International Application No. PCT/IB/2018/051768.

\* cited by examiner

AUTOMATIC POUR OVER COFFEE MAKER

FIELD OF THE INVENTION

This invention relates generally to the field of coffee makers.

BACKGROUND OF THE INVENTION

A drip type coffee maker is one in which coffee brew is obtained by a single pass of hot water through a quantity of coffee grounds. The hot water flowing to and through the coffee grounds may be intermittent rather than continuous. Also, the output temperature of the small amount of cold water withdrawn from the water tank and heated up by the heater is uncontrollable. This may cause the water temperature inside the carafe or thermal jug to be not hot enough, especially the first few cups. Moreover, if a user only needs to brew 4 cups of coffee using the 10-12 cups drip type coffee maker, they need to brew 10-12 cups because it is understood that the temperature of the first few cups from the 10-12 cups drip type coffee machine is not hot enough. Due to intermittent flow of hot water and uncontrollable small amount of cold water withdrawn from the water tank and heated up by the heater, distribution of hot water on coffee grounds would be uneven and with limited spread out areas, thereby resulting in coffee that is poorly extracted, less flavorful and aromatic.

For the above reasons, the present invention improves and rearranges the conventional drip type coffee machine construction in order to improve the temperature of the coffee, especially the first few cups. In this invention, the beverage machine can provide coffee or other beverages at an optimal temperature (FIG. 1). The water tank and heating system are placed on top of the machine in order to minimize any energy loss via the piping and tubing of pumps. In one embodiment, the hot water will be dispensed into the filter basket directly via a pour-over system that provides even water distribution on the coffee grounds.

Currently, there is no coffee makers that could reproduce manual pouring action over coffee ground when making pour over coffee. In fact, there is no electric coffee makers that could replicate manual pouring action over coffee ground.

The housing of current coffee makers requires expensive procedures to make and tedious process to assemble. The housings usually do not allow light to pass through so that one could not easily observe the process when hot water flow through the coffee ground.

To overcome the limitations of the existing coffee makers, this invention provides a pour over coffee maker with automatic pour over function.

SUMMARY OF THE INVENTION

One objective of this invention is to reduce temperature fluctuation, achieve optimal water temperature or manage water temperature, thereby serving a better tasting beverage such as coffee or tea.

For conventional drip type coffee makers, the coffee temperature from the initial brewing period is always too low (average below 75° C.). In contrast, the present invention ensures optimal coffee temperature even in the first few cups. Moreover, this invention eliminates many problems commonly found in most drip type coffee maker such as excessive steam, energy loss, and inconsistent brewing time. The present invention minimizes any potential impact to brewing time due to calcification, or even minimizes calcification.

The present invention is designed to improve beverage temperature without affecting the overall brewing time. For the existing drip type coffee machines, it is very hard to control output temperature or ensure temperature consistency (some variance or some fluctuation would happen in every brewing process) because they are using the traditional heating systems which are always positioned at the bottom of the machines. These heating systems heat and pump out hot water from the bottom to the top via a lot of pipes and tubes. In this way, significant amount of energy loss would happen during the process. The new system in this invention can produce hot coffee or other hot beverages at an optimal temperature in a simple and efficient way and energy (such as heat) loss is minimized during the brewing process. In one embodiment, after the optimal temperature is reached and detected by a temperature sensor, a valve will open to dispense the hot/warm water into an underlying filter basket by gravity. For example, in the default position, a piston valve opens a flow path between the cold water chamber and the hot water chamber but closes the flow path between the hot water chamber and the filter basket. In this embodiment, the user can fill up both the cold water and hot water chambers at the same time. After the user turns on the machine, the water inside the hot water chamber would be heated up. Once the water inside the hot water chamber reached the optimal temperature, the heater would be turned off and the piston valve would be pushed upward. As a result, the flow path between the cold water chamber and the hot water chamber would be closed, whereas the flow path between the hot water chamber and filter basket would be opened to dispense the hot water into the underlying filter basket by gravity. When the hot water chamber is being emptied, the temperature sensor detects a drop to certain pre-determined temperature, and the gear system starts to operate and moves the piston valve back to the default position. At the same time, the piston valve opens the flow path between the cold water chamber and the hot water chamber but closes the flow path between the hot water chamber and the filter basket to allow cold water to fill up the hot water chamber for the next batch of heating up or brewing.

The above heating process is accomplished by a unique structure of water container which is positioned on the top of the machine. When the water reaches its desirable temperature and comes into contact with ground coffee or tea leaves, a carafe collects end beverage being dripped from the filter basket. In this way, the end beverage temperature in the carafe or thermal jug can be more stable or significantly improved. The quality of the extracted coffee or tea would also be more consistent or significantly improved.

For machine with smaller capacity, the water container will only have one section because only hot water chamber is required. If the machine is bigger, the water container will be separated into two or more sections: cold water chamber(s) and hot water chamber(s). In one embodiment, a certain amount of water is heated and contained inside the hot water chamber. A valve system between these chambers limits the quantity of cold water flowing from the cold water chamber into the hot water chamber. In this way, a certain amount of water is heated in individual batch, which allows for easy management of time and water temperature in individual batch. Consequently, user waiting time is reduced and the user can choose to produce less amount of beverage.

According to various coffee authorities around the world, including the Specialty Coffee Association of America (SCAA), the Specialty Coffee Association of Europe (SCAE) and the European Coffee Brewing Centre (ECBC), the optimal coffee brewing and extraction temperature ranges from 92° C. to 96° C. This invention provides a brewing system that can comply with this requirement consistently.

In one embodiment, there is provided a brewing machine comprising (a) one or more cold water chambers and one or more hot water chambers, the cold water chambers are attached to the hot water chambers, and the water chambers are located on top of the machine; (b) a filter basket located beneath the hot water chamber(s); and (c) a valve controlling water flow (i) between the cold water chamber(s) and the hot water chamber(s) and (ii) between the hot water chamber(s) and the filter basket. In one embodiment, the hot water chamber(s) comprises a temperature sensor and a heating system. In another embodiment, the temperature sensor turns the heating system on or off at pre-determined temperatures.

In one embodiment, when the valve opens a flow path from the cold water chamber(s) to the hot water chamber(s), water flow from the hot water chamber(s) to the filter basket is stopped. Both the cold and hot water chambers can then be filled up with water. In another embodiment, when the valve closes a flow path from the cold water chamber(s) to the hot water chamber(s), water is allowed to flow from the hot water chamber(s) to the filter basket.

In one embodiment, the valve is a piston valve. In another embodiment, the valve is controlled by a gear system comprising one or more cams. In one embodiment, the gear system rotates under the control of a motor gear system comprising a motor, a micro switch, and gears. In one embodiment, the motor gear system begins to rotate at the same time when the heating system is turned on or off. In another embodiment, the motor gear system stops rotating when the micro switch is hit by a cam of the gear system.

In one embodiment, the cold water chamber(s) of the above brewing machine is/are placed on top of the hot water chamber(s). In another embodiment, water flows from the cold water chamber(s) to the hot water chamber(s) by gravity. In yet another embodiment, heated water flows from the hot water chamber(s) to the filter basket by gravity.

In one embodiment, the heated water from the hot water chamber(s) is evenly distributed and spread all over the coffee grounds in the filter basket via a pour over system. For example, once the water is heated to a desired temperature in the hot water chamber(s), the heated water would be dispensed in a continuous flow to a pour over system. The pour over system would distribute and spread the heated water all over the coffee grounds in the filter basket.

This invention provides a coffee maker comprising a top housing connected to a bottom housing via a plurality of connecting elements such that the top housing is enacted above the bottom housing; a water tank positioned on top of the top housing; a carafe to be placed under the top housing, the carafe comprises an upper part having a brewing cone; and a rotating spout located at the bottom of the top housing and above the carafe for pouring hot water into the carafe.

In one embodiment, this invention provides a coffee maker comprising (i) a top housing (2) connected to a bottom housing (3) via a plurality of connecting elements (4) such that the top housing is enacted above the bottom housing, (ii) a water tank (1) positioned on top of the top housing, (iii) a carafe (5) to be placed under said top housing, said carafe comprises an upper part having a brewing cone (51), and (iv) a rotating spout (6) located at the bottom of said top housing and above said carafe for pouring hot water into said carafe.

In one embodiment, the rotating spout of the present coffee maker is driven by a motor when a temperature sensor detects a specified temperature in the water tank. In one embodiment, the rotating spout is driven to rotate concentrically above said brewing cone.

In one embodiment, the connecting elements are connected to said top housing and bottom housing by an interlock system. For example, said locking system comprises (i) a hook-like feature (41) located on both ends of the connecting elements and (ii) a piece of interlock (21) located adjacent to a wall of the top housing or bottom housing.

DETAILED DESCRIPTION OF THE INVENTION

Figure 1:
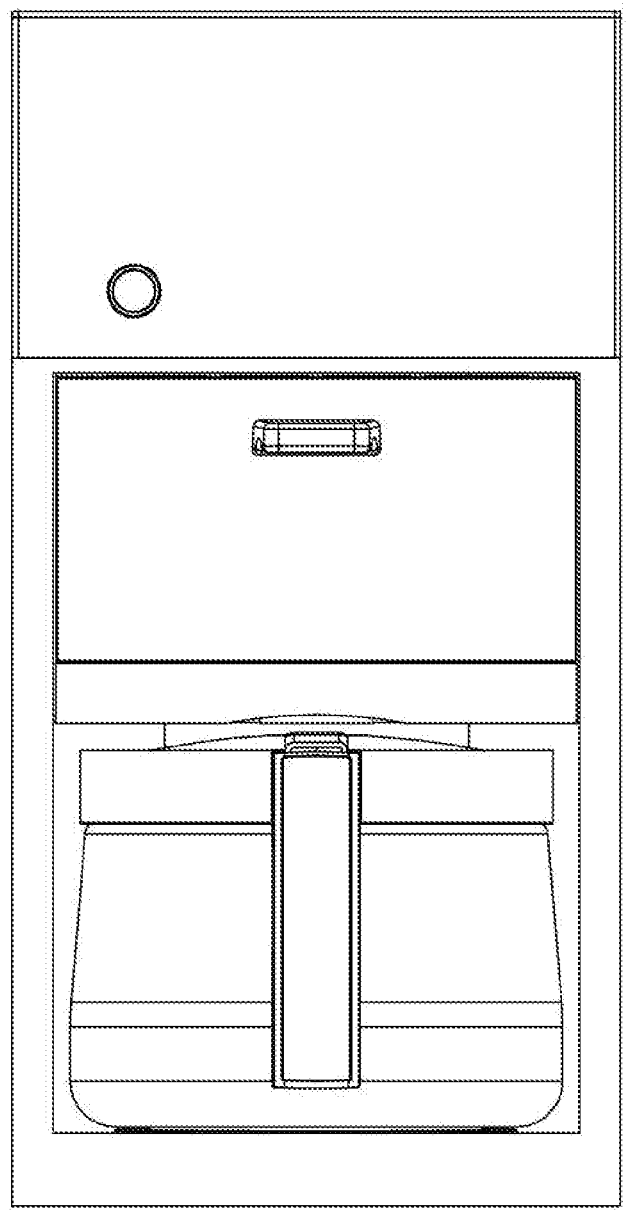
FIG. 1 shows the front view of one embodiment of this invention.
Figure 2:
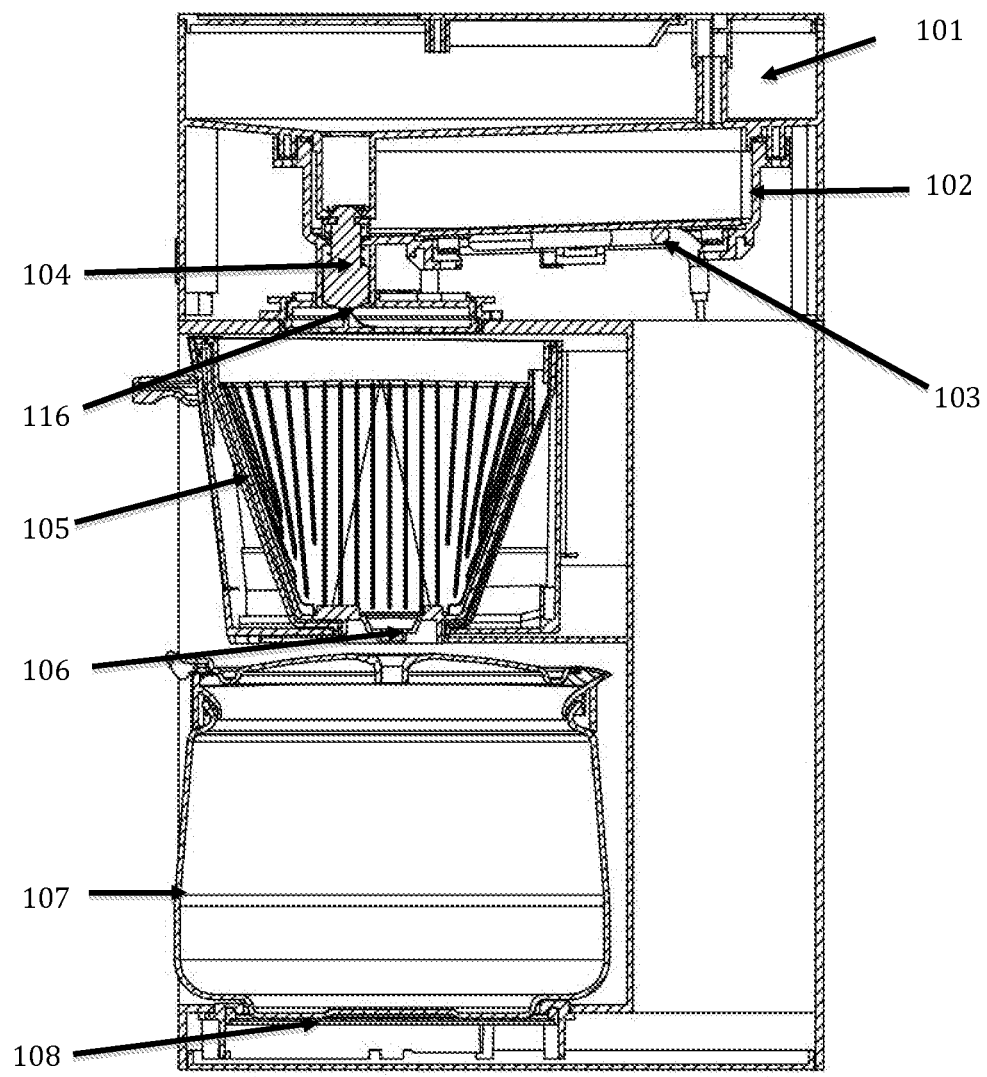
FIG. 2 shows a side section view of one embodiment of this invention.
Figure 3:
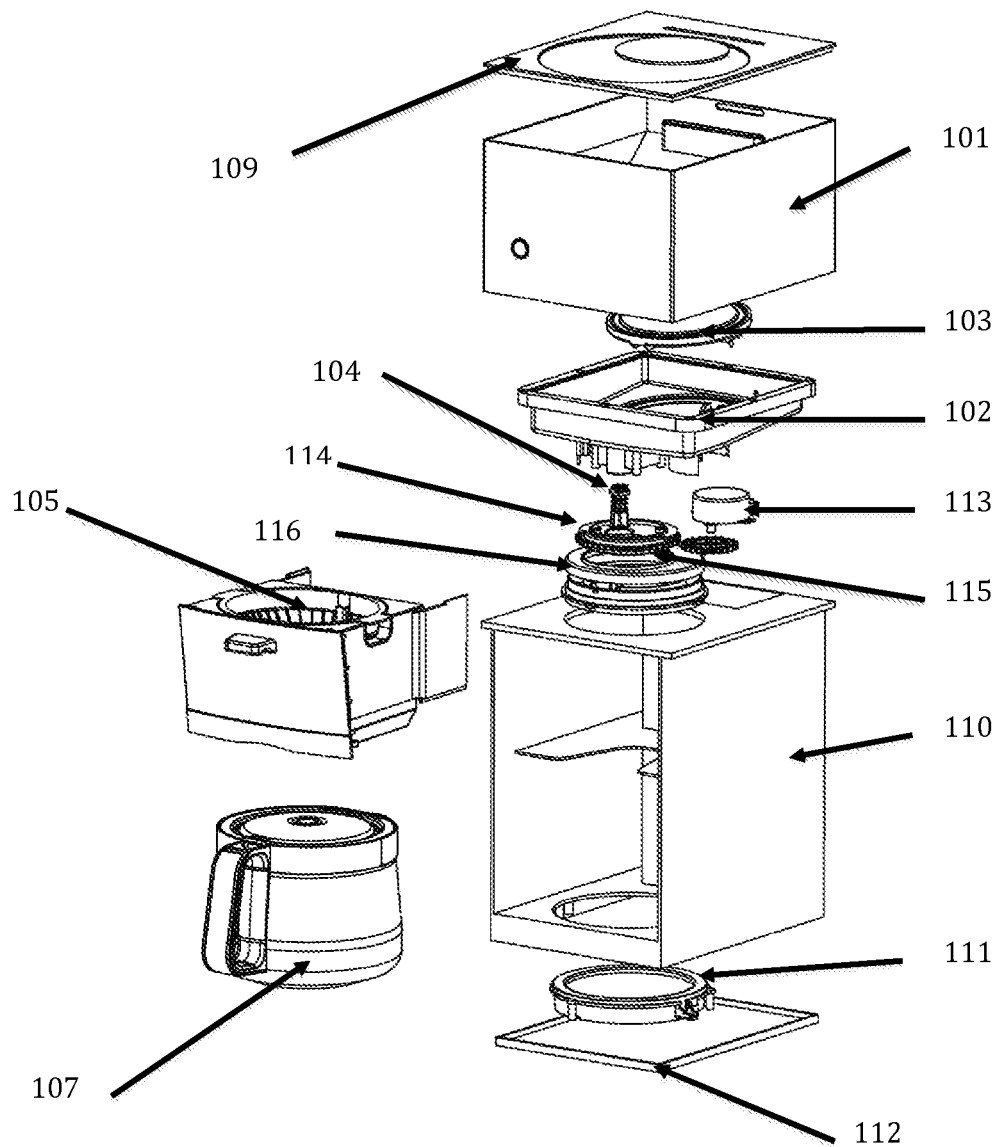
FIG. 3 shows an exploded perspective view of one embodiment of this invention.

The configuration of one embodiment of this invention is shown in FIGS. 1-3. A water tank sits at the top of the machine and a filter basket is located underneath the water tank. A cup, mug or glass carafe or thermal jug is placed underneath the filter basket. In one embodiment, only one button is required to turn on and off the machine.

In one embodiment, a body (110) supports one or more cold water chamber or water supply chamber (101) which is connected to the hot water chamber (102). In between these chambers (101) & (102), there is a piston valve (104) that controls water flow from the cold water chamber (101) to the hot water chamber (102). The default position of this piston valve (104) opens a flow path from the cold water chamber (102) to the hot water chamber (101) but closes a flow path from the hot water chamber to the filter basket. A user pours cold water into the cold water chamber directly or via the top lid (109) and the cold water fills up all the chambers up to a maximum level. In another embodiment, there is only the hot water chamber (102) and water is poured directly into the hot water chamber.

Figure 4:
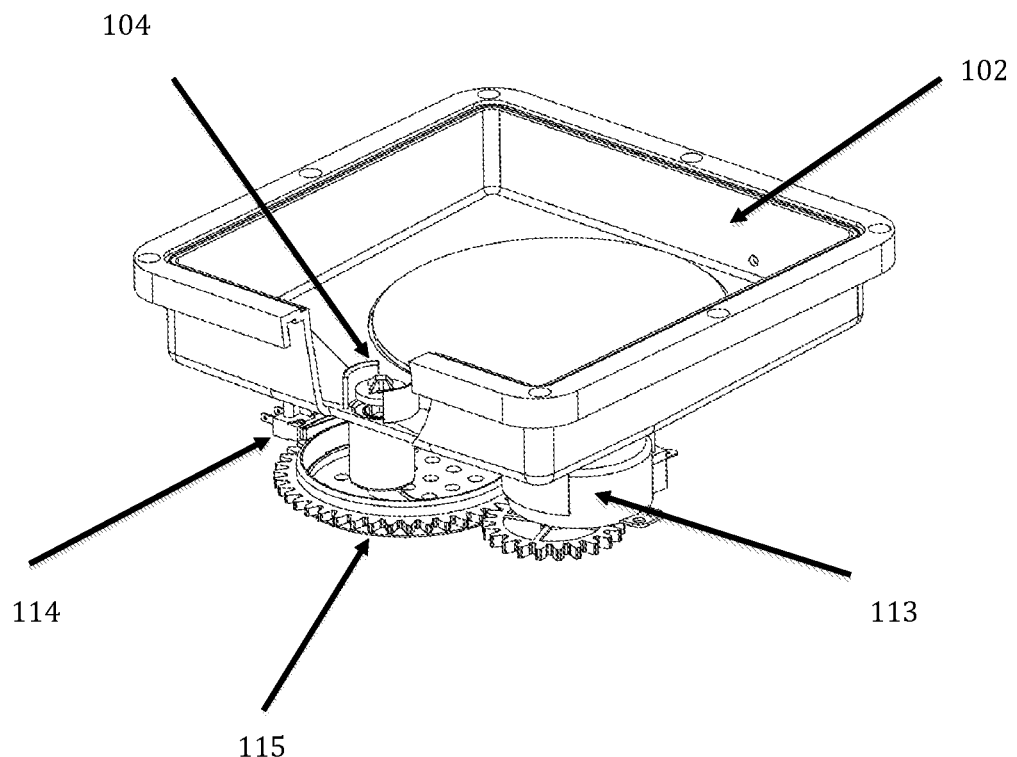
FIG. 4 shows an exploded perspective view of one embodiment of the piston valve and gear system.

In one embodiment, the machine is turned on by pressing an On/Off button. The heating system (103) will be turned on to heat up the cold water in the hot water chamber. An electronic temperature sensor built in the hot water chamber (102) monitors the water temperature. When the water reaches the optimal temperature, the heating system (103) will be turned off. The motor gear system (113) will begin to rotate the gear system (115). In one embodiment shown in FIGS. 4-6, the gear system (115) is designed with 2 separated cams, cam 1 is for activating the micro switch (114) and cam 2 is for activating the valve piston (104). Once the gear system (115) rotates to a proper position, cam 1 will activate the micro switch, the motor gear system (113) will stop rotating, and cam 2 on top of the gear system (115) will push the piston valve upwards at the same time. The flow path between the hot water chamber (102) and the filter basket (105) is thus opened and the heated water would flow gradually from the hot water chamber (102) through the pour over system (116) to the filter basket (105). Once all the heated water goes to the filter basket (105) and the hot water chamber (102) becomes empty, the electronic temperature sensor will detect a drop in temperature that re-activates the motor system (113) and gear system to restore the gear system (115) back to the default position, i.e. the piston valve (104) will open a flow path between the cold water chamber (101) and the hot water chamber and close the flow path between the hot water chamber (102) and the filter basket to allow cold water to fill up the hot water chamber (102) for the next batch of heating up or brewing.

The filter basket (105) includes a pause and serve valve (106) that enables liquid beverage to be stored in the basket (105). When the valve (106) is pushed open by the container (107), the liquid beverage (e.g. coffee or tea) would flow through the valve (106) into the container (107). The container may be a cup, mug or glass carafe or thermal jug. A keep warm heater (108) built inside of the keep warm plate (111) can be placed underneath the container (107) if a warming feature is required. The keep warm heater (108) is covered by a bottom cover (112).

The lid (109) placed on top of the water chambers is to cover the water chambers when the machine is in operation.

The heating system (103) can be any type of heating system generally known in the art. Similarly, any power can be used in the heating system according to what is known in the art.

The gear system (115) and motor gear system (113) can be produced in any kind of material. The main function of these gear systems is to open the piston valve (104). Moreover, cam 1 at the gear system and the micro switch act as a signal for the gear systems to turn on and off.

Figure 7A:
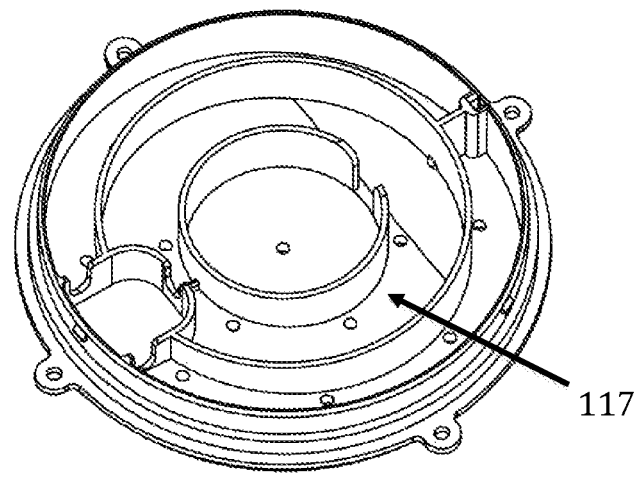
FIG. 7A shows one embodiment of a perspective view of pour over system.
Figure 7B:
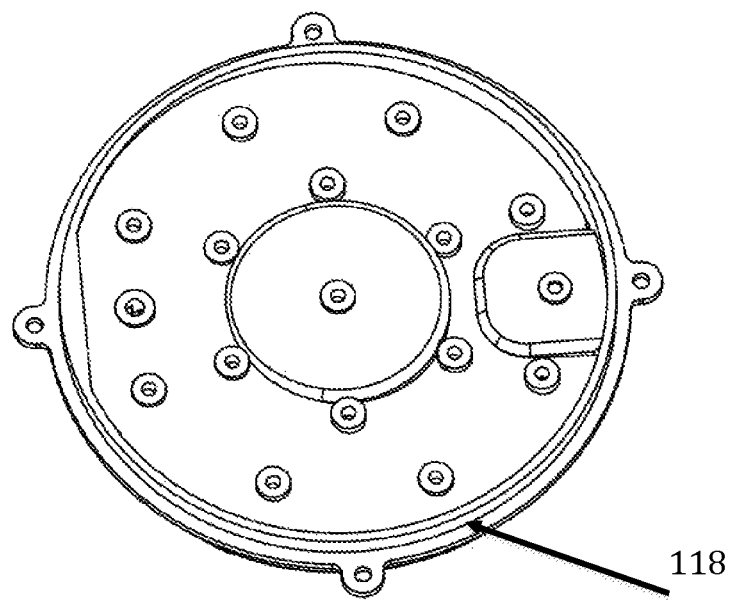
FIG. 7B shows one embodiment of another perspective view of pour over system.

FIG. 7 shows an embodiment of the pour over system (116). In one embodiment, the pour over system is located in between the hot water chamber(s) and the filter basket. In one embodiment, the pour over system comprises at least one dispensing channel (117), which guide(s) the flow of water from the hot water chamber to the filter basket, and at least one drain hole (118) that allows the flow of water to be dispensed and spread all over the coffee grounds in the filter basket. This ensures the ground coffees is mostly or completely wet, warmed, steeped and extracted. In one embodiment, the dispensing channel is contained in a circular piece. In another embodiment, the flow of the water in the dispensing channel can be in circular or any distributing forms. In one embodiment, the heated water is delivered to reach every surface or spot of ground coffee in the filter basket via the plurality of drain holes at the bottom surface of the pour over system. This is to ensure all surfaces or spots of ground coffee in the filter basket are well contacted with water. In one embodiment, each dispensing channel has at least one drain hole.

The pour over system is to replicate hot water pouring on ground coffee by a system instead of a person. The pour over system helps to improve some common inconsistencies with manual pour over, among them disorganized and inconsistent pours, and irregular extraction.

The pour over system (116) can be produced in any kind of material and shape. The main function of the pour over system is to distribute and spread heated water all over the coffee grounds in the filter basket.

In one embodiment, the pour over system (116) has at least one dispensing channel (117) with at least one drain hole (118). The dispensing channel (117) can be in any size or any shape.

One of ordinary skill in the art would readily configure the filter basket (105) to fit for any size or any shape of filters or tea container.

In the present invention, a cup, mug or glass carafe or thermal jug can be used as the container (107). When a glass carafe is used, a separated heating system may be required for the keep warm feature.

Figure 5A:
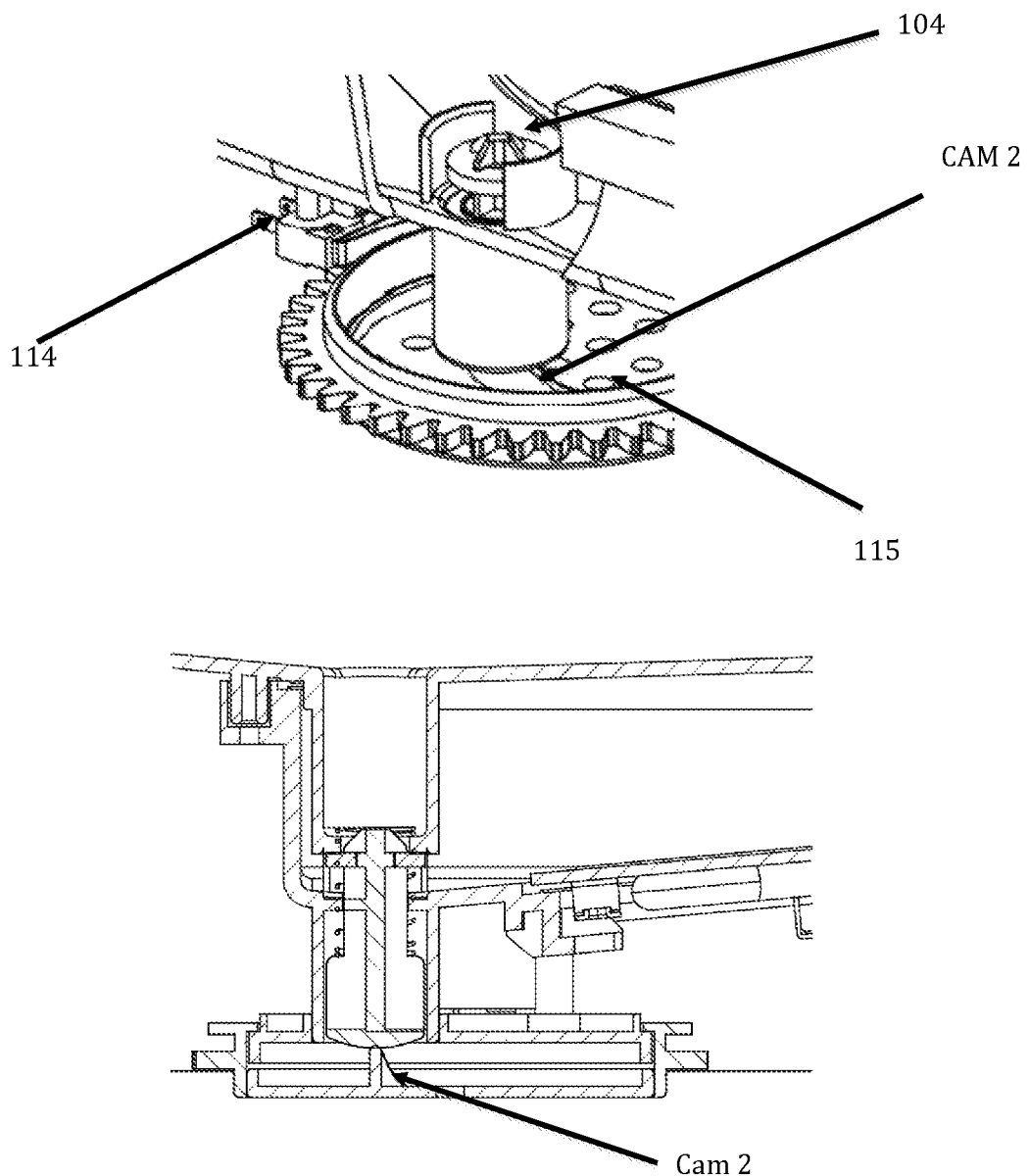
FIG. 5A shows one embodiment of the gear system when the valve closes (default position) the flow path from the hot water chamber to the filter basket.
Figure 5B:
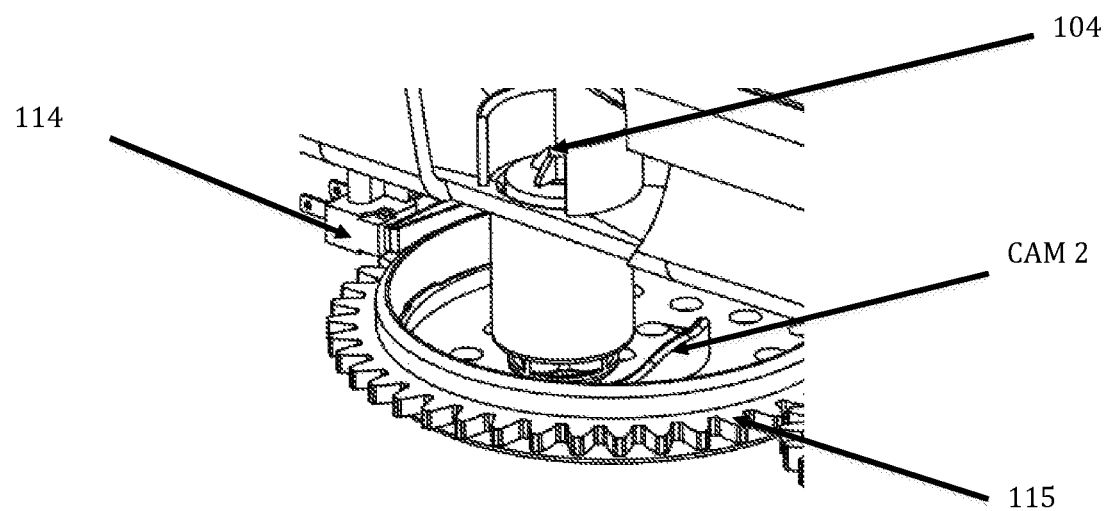
FIG. 5B shows one embodiment of the gear system when the valve opens a flow path from the hot water chamber to the filter basket.
Figure 5B:
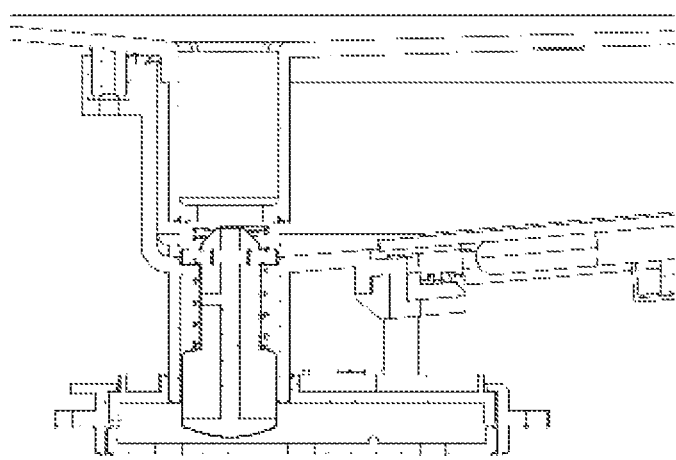
Figure 6:
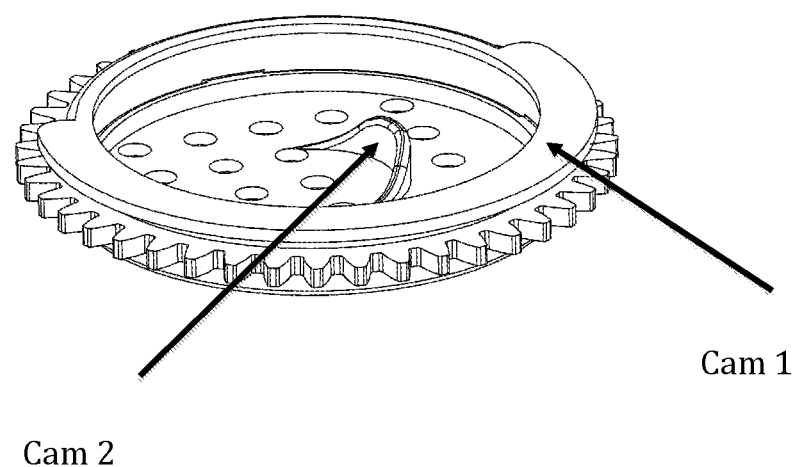
FIG. 6 shows one embodiment of a perspective view of the gear system.

FIG. 5 shows clearly how to operate (open and close) the piston valve (104) when an optimal temperature is reached in the hot water chamber. In one embodiment, the default position of the valve piston (104) opens the flow path from cold water chamber to hot water chamber (101) but closes the flow path from the hot water chamber (102) to filter basket (105) (FIG. 5A). Under this condition, water can fill up both water chambers. After the machine is turned on, the heating system (103) will heat up the cold water in the hot water chamber (102). In one embodiment, an electronic temperature sensor built in the hot water chamber (102) would monitor the water temperature. When the water reaches an optimal temperature, the heating system (103) will be turned off. The motor gear system (113) will begin to rotate the gear system (115). Once the gear system rotates to a proper position and activates the micro switch by a cam of the gear system, the gear system will stop the motor gear system (113) from rotating (FIG. 5B) and another cam on top of this gear system (115) will push the piston valve upward. This opens the flow path between the hot water chamber (102) and filter basket (105) and closes the flow path between the cold water chamber (101) and hot water chamber (102), i.e. hot water can flow out of the hot water chamber to the filter basket but cold water from the cold water chamber cannot flow into the hot water chamber to prevent the dilution of the hot water by the cold water.

In one embodiment, the present invention provides a brewing machine comprising: (a) one or more cold water chambers and one or more hot water chambers, the cold water chambers are attached to the hot water chambers, and the water chambers are located on top of the machine; (b) a pour over system located beneath each hot water chamber(s); (c) a filter basket located beneath each pour over system; and (d) a valve controlling water flow (i) between the cold water chamber(s) and the hot water chamber(s) and (ii) between the hot water chamber(s) and the filter basket.

In another embodiment, the present invention provides a brewing machine comprising: (a) one or more hot water chambers located on top of the machine; (b) a pour over system located beneath each hot water chamber(s); (c) a filter basket located beneath each pour over system; and (d) a valve controlling water flow between the hot water chamber(s) and the filter basket.

In one embodiment, the hot water chamber(s) comprises a temperature sensor and a heating system. In one embodiment, the temperature sensor turns the heating system on or off at pre-determined temperatures.

In one embodiment, the valve is controlled by a gear system comprising one or more cams. In one embodiment, the gear system rotates under the control of a motor gear system comprising a motor, a micro switch, and gears.

In one embodiment, the motor gear system begins to rotate at the same time when the heating system is turned on or off. In another embodiment, the motor gear system stops rotating when the micro switch is hit by a cam of the gear system.

In one embodiment, the valve is a piston valve.

In one embodiment, when the valve opens a flow path from the cold water chamber(s) to the hot water chamber(s), water flow from the hot water chamber(s) to the filter basket is stopped.

In one embodiment, when the valve closes a flow path from the cold water chamber(s) to the hot water chamber(s), water is allowed to flow from the hot water chamber(s) to the filter basket.

In one embodiment, when the valve opens a flow path from the cold water chamber(s) to the hot water chamber(s), and stops water flow from the hot water chamber(s), the cold and hot water chambers can be filled up with water.

In one embodiment, the cold water chamber(s) is placed on top of the hot water chamber(s).

In one embodiment, water flows from the cold water chamber(s) to the hot water chamber(s) by gravity.

In one embodiment, heated water flows from the hot water chamber(s) to the filter basket by gravity via the pour over system. In one embodiment, said pour over system comprises one or more dispensing channel and at least one drain hole.

In one embodiment, this invention provides a coffee maker having an easily assembled housing and rotating spout.

In one embodiment, the coffee maker of this invention comprises: a water tank (1) on a top housing (2) connected to a bottom housing (3); the bottom of the top housing comprises a rotating spout (6); the bottom housing (3) comprises a power switch and a control board; a carafe (5) configured to be placed on the bottom housing, wherein the carafe comprises a brewing cone (51) that can be removably attached to an upper part of the carafe; and at least one connecting element having two ends; wherein the at least one connecting element connects to the top housing at one end and to the bottom housing at another end such that the top housing is enacted above the bottom housing.

In one embodiment, the at least one connecting element is connected to the top housing and the bottom housing by an interlock system as shown in FIGS. 12A-D. In another embodiment, the interlock system comprises a structure on each of the two ends of the connecting elements for insertion into the top housing and the lower housing where an interlock structure will snug fit onto each of the structures on the connecting elements. In another embodiment, the structure on the connecting element is a hook to be inserted into corresponding holes on the top housing and bottom housing. Each of the top housing and bottom housing has one or more pieces of interlock that are snug fitted to below the hooks for locking the connecting elements in place.

In one embodiment, interlocking the connecting elements with the top housing and bottom housing requires less time than assembling a traditional coffee maker housing.

In one embodiment, the number, shape, and/or spacing of the connecting elements can be tailored to optimize the amount of light available for viewing the brewing process in the top part of the carafe.

In one embodiment, the connecting element is made of wood, metal, glass, plastic, leather or die cast.

In another embodiment, the connecting element is made of transparent material.

In one embodiment, the connecting element is curved. In another embodiment, the connecting element is straight.

In one embodiment, the brewing cone is enclosed in a case made of transparent material.

In one embodiment, the carafe is made of transparent material.

In one embodiment, the bottom housing comprises a keep warm system.

In one embodiment, the rotating spout rotates concentrically above the brewing cone when water from the water tank is dispensed onto the brewing cone through the rotating spout.

In one embodiment, the rotating spout comprises an outlet which opens horizontally.

In one embodiment, the rotating spout comprises an outlet which opens diagonally.

In one embodiment, the rotating spout is driven by a motor.

In one embodiment, the water tank comprises a temperature sensor, wherein the rotating spout is driven by a motor when the temperature sensor detects a specified temperature in the water tank. In another embodiment, the specified temperature can be controlled by a user. In one embodiment, the water tank is placed on top of the brewing cone so that water at the specified temperature can be directly released onto ground coffee so as to meet stringent coffee brewing requirements such as SCAA.

In one embodiment, wherein the water tank is made of a transparent material.

In one embodiment, the water tank comprises a heating system, a valve and a temperature sensor, wherein when the temperature sensor detects water temperature in the water tank reaches a specified temperature, the heating system is turned off and the valve is opened to allow hot water to flow to the brewing cone via the rotating spout.

This invention further provides a coffee maker with a rotating spout.

In one embodiment, the coffee maker comprises: a water tank on a top housing and a rotating spout; a bottom housing comprising a brewing cone; wherein the rotating spout rotates concentrically above the brewing cone when water from the water tank is dispensed onto the brewing cone through the rotating spout.

In one embodiment, the rotating spout comprises an outlet which opens horizontally.

In one embodiment, the rotating spout comprises an outlet which opens diagonally.

In one embodiment, the rotating spout is driven by a motor.

In one embodiment, the water tank comprises a temperature sensor, wherein the motor drives the rotating spout when the temperature sensor detects a specified temperature in the water tank.

In one embodiment, the water tank is made of a transparent material.

In one embodiment, the brewing cone is made of a transparent material. In another embodiment, the brewing cone is made of plastic, steel or die cast.

In one embodiment, the rotating spout is made of a transparent material. In another embodiment, the rotating spout is made of plastic, steel or die cast.

In one embodiment, the water tank comprises a heating system, a valve and a temperature sensor, wherein, when the valve detects water temperature in the water tank reaches a specified temperature, the heating system is turned off and the valve opens so that hot water will flow to the brewing cone via the rotating spout.

This invention also provides a coffee maker having an easily assembled housing.

In one embodiment, the coffee maker comprises: a water tank on a top housing; a bottom housing; at least one connecting element having two ends; wherein the at least one connecting element connects to the upper structure at one end and the base structure at the other end such that the upper structure is enacted above the base structure.

In one embodiment, the at least one connecting element is connected to the upper structure and the base structure by an interlock system as shown in FIGS. 12A-D.

In one embodiment, the at least one connecting element is made of wood, metal, glass, plastic, leather or die cast.

In another embodiment, the at least one connecting element is made of transparent material.

In one embodiment, the at least one connecting element is curved. In another embodiment, the at least one connecting element is straight.

In one embodiment, the coffee maker further comprises a brewing cone and a carafe that can be connected to form a single structure. In another embodiment, the brewing cone is made of transparent material. In yet another embodiment, the carafe is made of transparent material. In another embodiment, the brewing cone and carafe are connected to form a hour-glass structure.

In one embodiment, the base structure comprises a keep warm system.

In one embodiment, interlocking the connecting elements with the upper structure and lower structure via the interlock system requires less time than assembling a traditional coffee maker housing. In another embodiment, the interlock system comprises a structure on each of the two ends of the connecting elements for insertion into the upper structure and the base structure where an interlock structure that snug fit onto each of the structures on the connecting elements. In another embodiment, the structure on the connecting element is a hook to be inserted into corresponding holes on the upper and base structures. Each of the upper and base structures has one or more pieces of interlock that are snug fitted to below the hooks for locking the connecting elements in place.

In one embodiment, the number, shape, spacing of the connecting elements can be tailored to optimize the amount of light entering the housing for viewing of the brewing process.

In one embodiment, the present invention provides a coffee maker comprising (i) a top housing (2) connected to a bottom housing (3) via a plurality of connecting elements (4) such that the top housing is enacted above the bottom housing, (ii) a water tank (1) positioned on top of the top housing, (iii) a carafe (5) to be placed under the top housing, the carafe comprises an upper part having a brewing cone (51), and (iv) a rotating spout (6) located at the bottom of the top housing and above the carafe for pouring hot water into the carafe. In one embodiment, the water tank is made of a transparent material. In another embodiment, the water tank comprises a heating system, a valve and a temperature sensor, wherein when the temperature sensor detects a specified temperature, the heating system is turned off and the valve is opened to allow hot water flowing via the rotating spout.

In one embodiment, the rotating spout of the present coffee maker is driven by a motor when a temperature sensor detects a specified temperature in the water tank. In one embodiment, the rotating spout is driven to rotate concentrically above the brewing cone.

In one embodiment, the rotating spout comprises an outlet which opens horizontally. In another embodiment, the rotating spout comprises an outlet which opens diagonally.

In one embodiment, the bottom housing comprises a keep warm system.

In one embodiment, the connecting elements are made of wood, metal, glass, plastic, leather or die cast. In another embodiment, the connecting elements are made of transparent material. The connecting elements can be curved or straight.

In one embodiment, the connecting elements are connected to the top housing and bottom housing by an interlock system. For example, the locking system comprises (i) a hook-like feature (41) located on both ends of the connecting elements and (ii) a piece of interlock (21) located adjacent to a wall of the top housing or bottom housing.

In one embodiment, this invention provides a coffee maker comprising: a top housing (2) connected to a bottom housing (3) via a plurality of connecting elements (4) such that the top housing is enacted above the bottom housing; a water tank (1) positioned on top of the top housing; a carafe (5) to be placed under the top housing, the carafe comprises an upper part having a brewing cone (51); and a rotating spout (6) located at the bottom of the top housing and above the carafe for pouring hot water into the carafe.

In one embodiment, the water tank is made of a transparent material.

In one embodiment, the water tank comprises a heating system, a valve and a temperature sensor, wherein when the temperature sensor detects a specified temperature, the heating system is turned off and the valve is opened to allow hot water flowing via the rotating spout.

In one embodiment, the rotating spout is driven by a motor when a temperature sensor detects a specified temperature in the water tank.

In one embodiment, the rotating spout is driven to rotate concentrically above the brewing cone.

In one embodiment, the rotating spout comprises an outlet which opens horizontally.

In one embodiment, the rotating spout comprises an outlet which opens diagonally.

In one embodiment, the bottom housing comprises a keep warm system.

In one embodiment, the plurality of connecting elements are made of wood, metal, glass, plastic, leather or die cast.

In one embodiment, the plurality of connecting elements are made of transparent material.

In one embodiment, the plurality of connecting elements are curved.

In one embodiment, the plurality of connecting elements are straight.

In one embodiment, the plurality of connecting elements are connected to the top housing and bottom housing by an interlock system. In another embodiment, the interlock system comprises a hook-like feature (41) located on both ends of each of the plurality of connecting elements, a plurality of holes on the top housing and bottom housing corresponding to each of the plurality of connecting elements (4), and a piece of interlock (21) located adjacent to a wall of the top housing or bottom housing.

The invention will be better understood by reference to the Example which follows, but those skilled in the art will readily appreciate that the specific examples are for illustrative purposes only and should not limit the scope of the invention which is defined by the claims which follow thereafter.

It is to be noted that the transitional term "comprising", which is synonymous with "including", "containing" or "characterized by", is inclusive or open-ended and does not exclude additional, un-recited elements or method steps.

EXAMPLE

Figure 8:
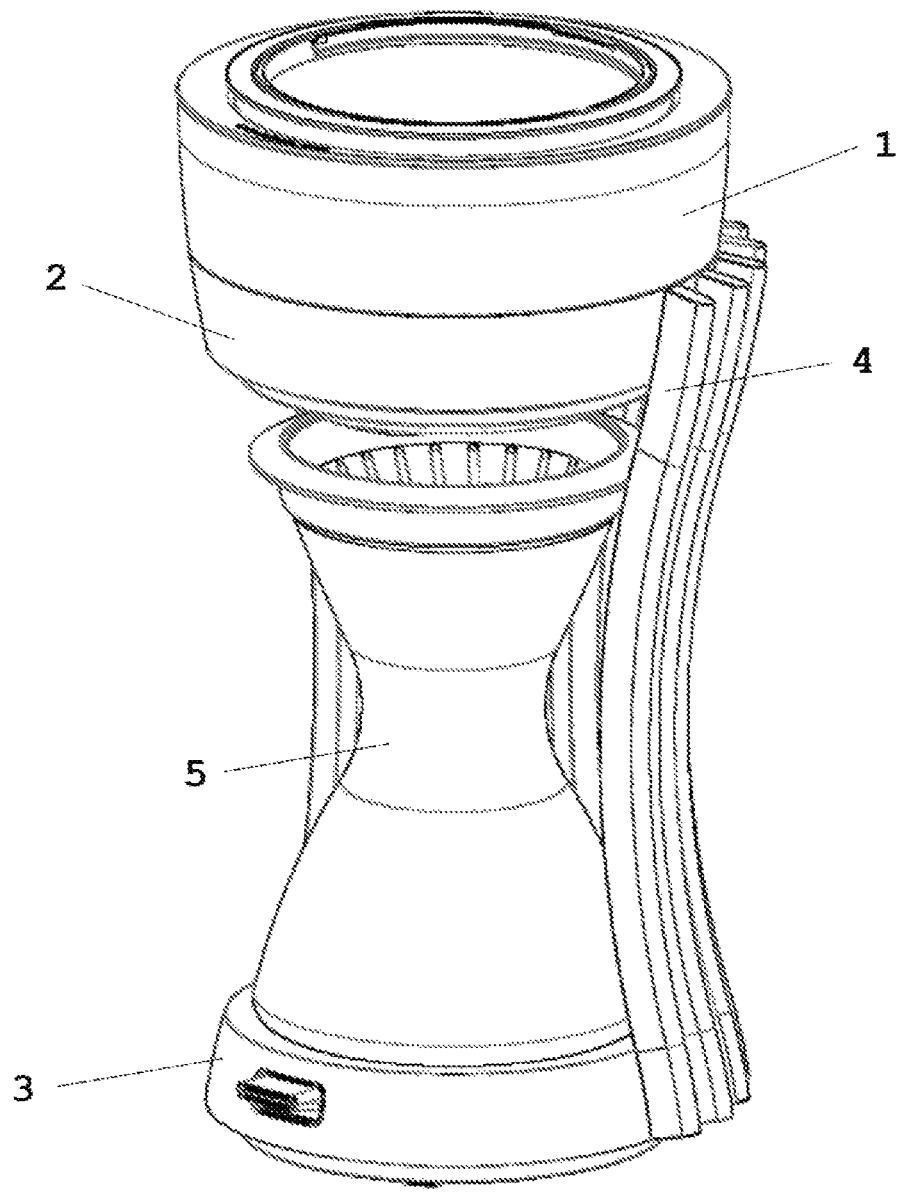
FIG. 8 shows an isometric view of an embodiment of this invention having a water tank (1) on a top housing (2) connected to a bottom housing (3) via a plurality of connecting elements (4) to form a space between the top housing (2) and bottom housing (3) to house a carafe (5).
Figure 9:
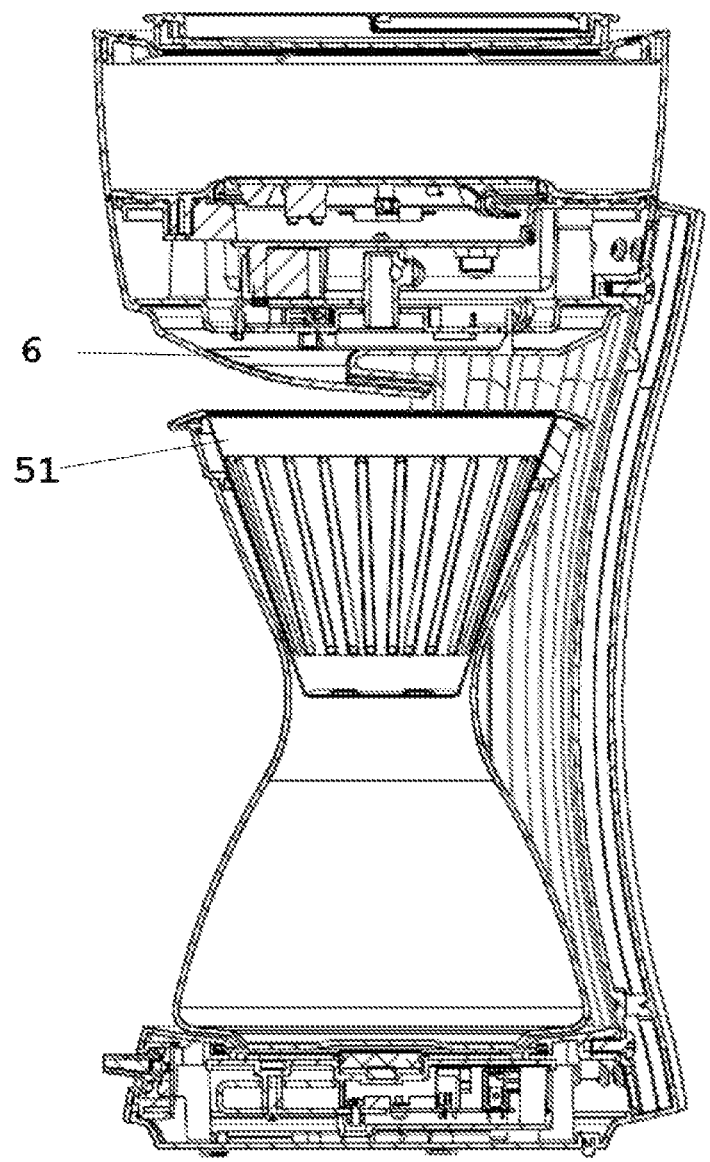
FIG. 9 shows a cross-section of the coffee maker. At the bottom of the top housing is a rotating spout (6), and the upper part of the carafe comprises a brewing cone (51).

FIG. 8 shows an isometric view of an embodiment of this invention. The coffee maker comprises a water tank (1) on a top housing (2) connected to a bottom housing (3) via a plurality of connecting elements (4) to form a space between the top housing (2) and bottom housing (3) to house a carafe (5). At the bottom of the top housing is a rotating spout (6) to imitate manual pouring of hot water into the carafe. The carafe (5) comprises an upper part having a brewing cone (51) and a lower part for receiving brewed coffee. Coffee ground is placed inside the brewing cone and hot water from the rotating spout will pour over and percolates the coffee ground. The water tank (1) comprises a heating system, a valve and a temperature sensor, wherein when the temperature sensor detects water temperature in the water tank reaches a specified temperature, the heating system is turned off and the valve is opened to allow hot water to flow to the brewing cone via the rotating spout. FIG. 9 is a cross-section of the coffee maker showing the spatial relationship of these components.

Figure 10:
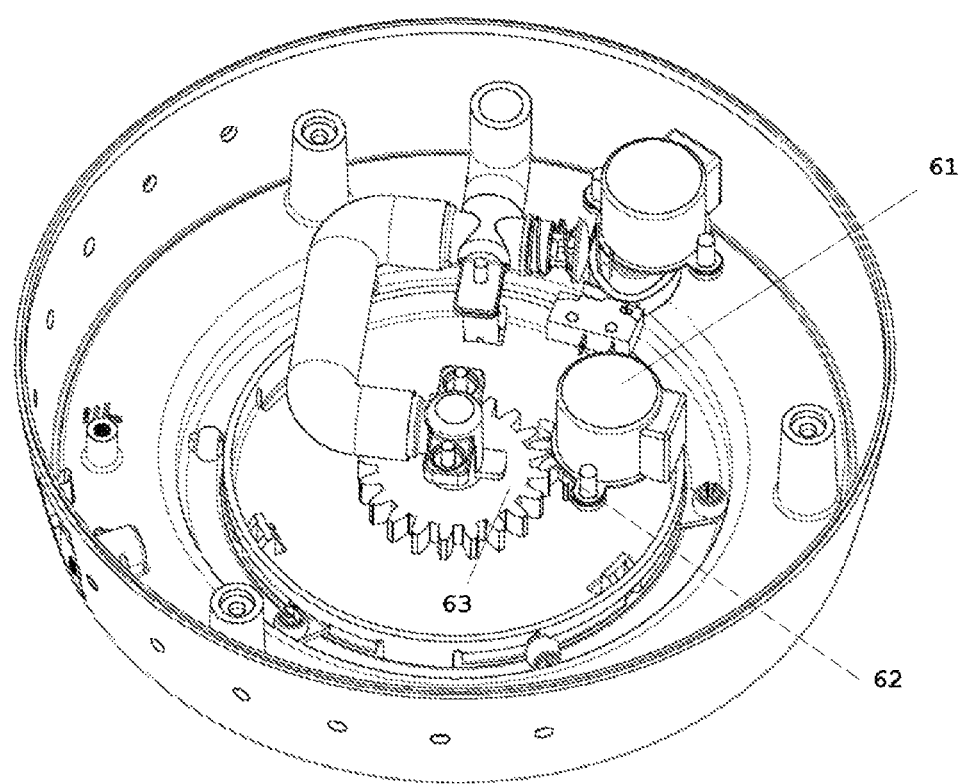
FIG. 10 shows a mechanism for controlling the rotating spout. A rotate spout drive motor (61) drives a first rotate spout drive gear (62) which in turn drives a second rotate spout gear (63) to cause the spout to rotate.

FIG. 10 shows the mechanism for controlling the rotating spout (6). A rotate spout drive motor (61) drives a rotate spout drive gear (62) which in turn drives a rotate spout gear (63) to cause the spout to rotate when the rotate spout drive motor (61) is turned on.

Figure 11A:
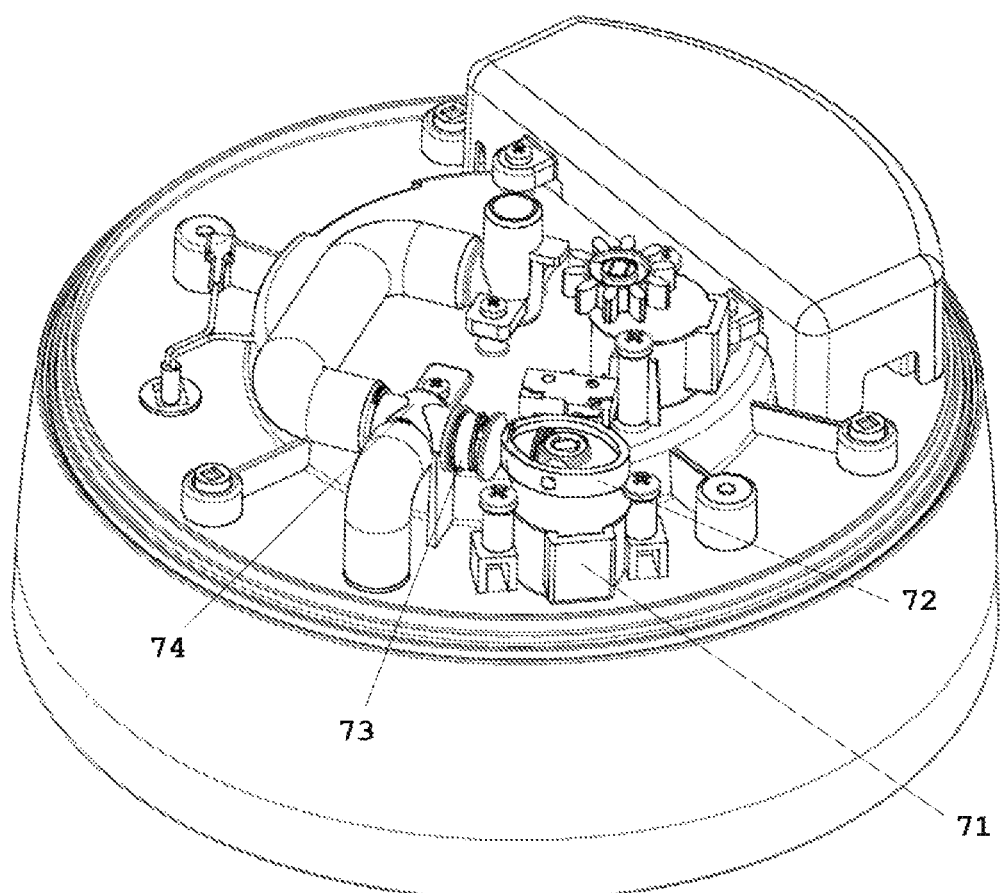
FIG. 11A shows a system (7) for controlling water supply to the rotating spout. A spout valve drive motor (71) drives a spout valve cam (72) that pushes on a spout valve lever (73) to act on a spout valve body (74). The valve is shown in an open position.
Figure 11B:
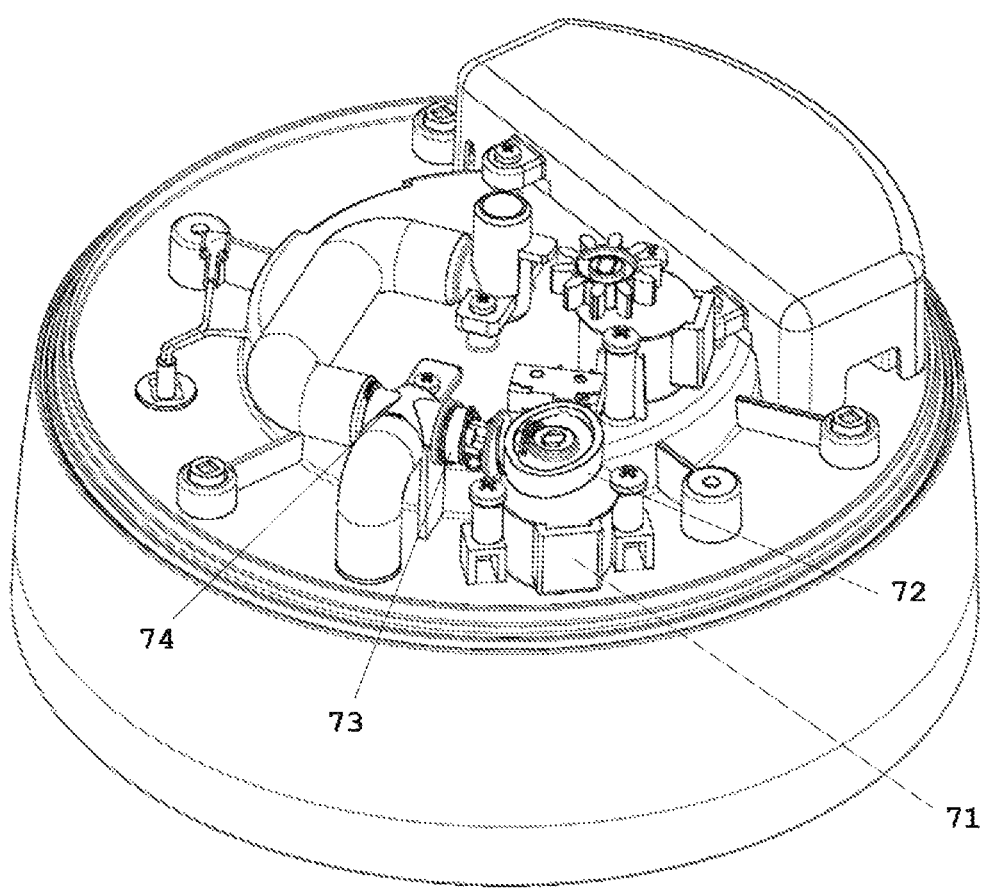
FIG. 11B shows the same system as in FIG. 11A for controlling water supply to the rotating spout, with the valve in a closed position.
Figure 12A:
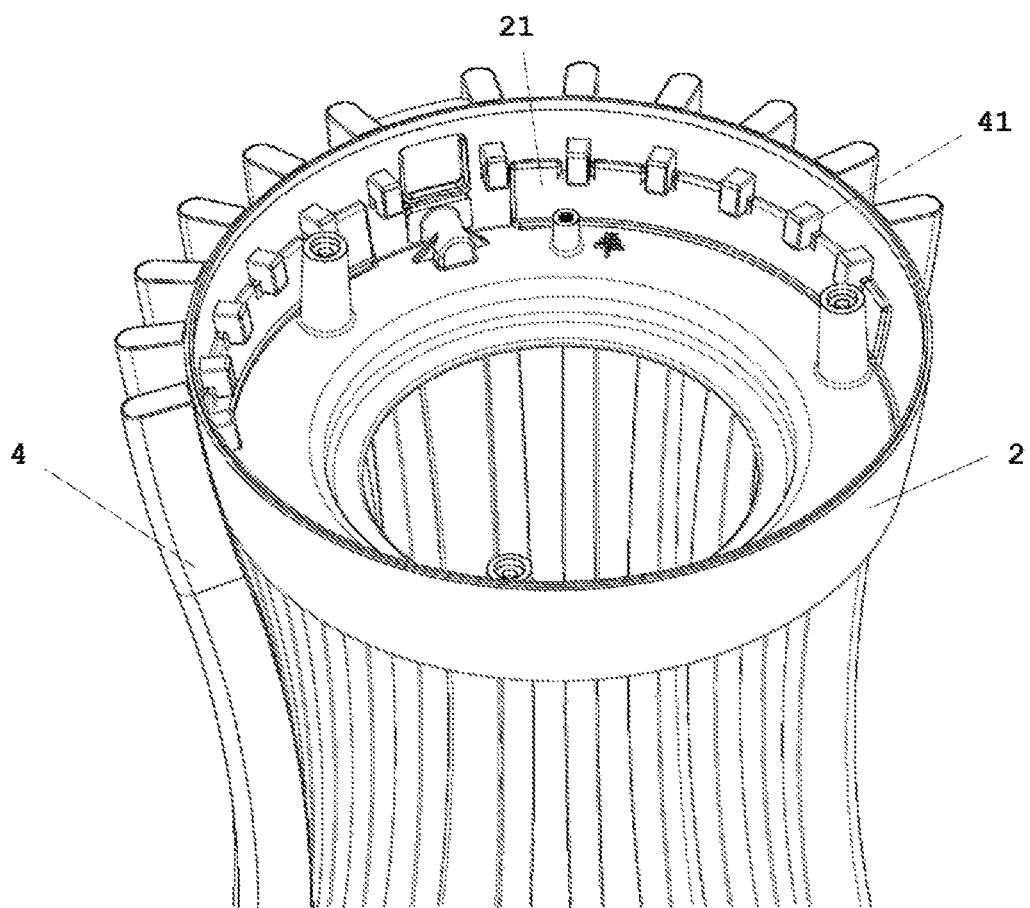
FIG. 12A shows an interlocking system for connecting the plurality of connecting elements (4) to the top housing (2) in unlocked position. A hook-like feature (41) is inserted into each of the holes on the wall of the top housing. Adjacent to the wall of the top housing is a piece of interlock (21).
Figure 12B:
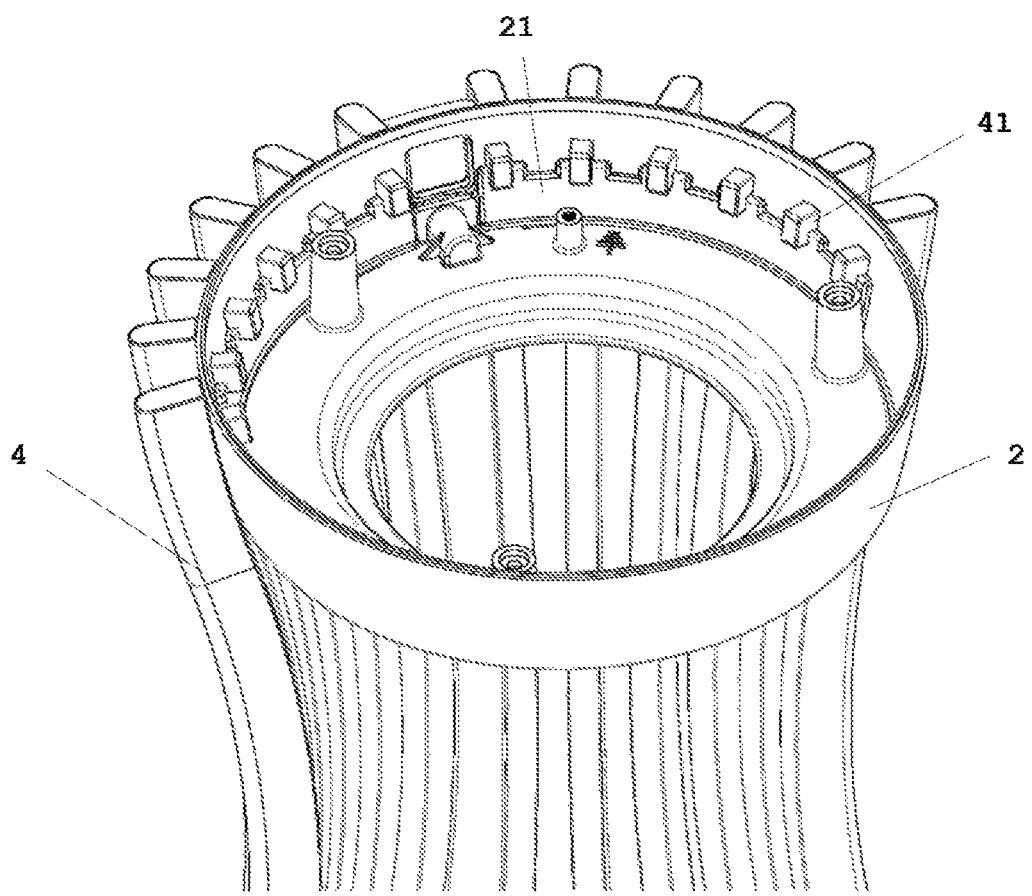
FIG. 12B shows the same interlocking system as in FIG. 12A in a locked position.
Figure 12C:
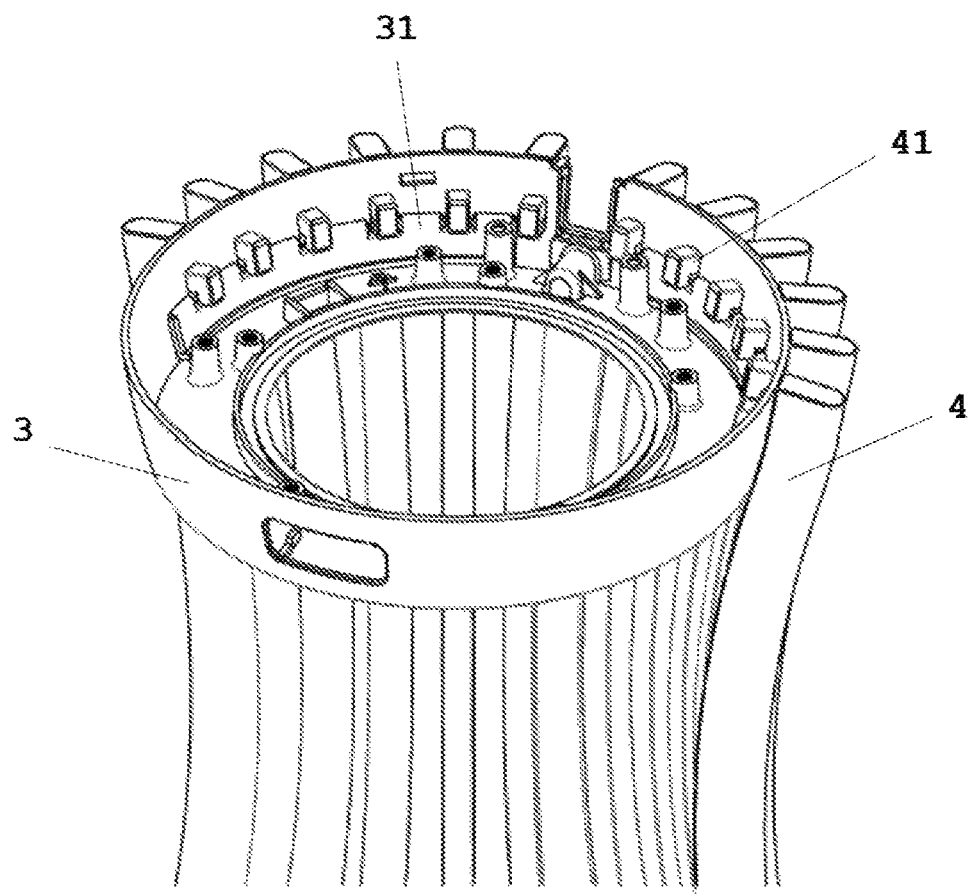
FIG. 12C shows an interlocking system for connecting the plurality of connecting elements (4) to the bottom housing (3) in an unlocked position. A hook-like feature (41) is inserted into each of the holes on the wall of the bottom housing. Adjacent to the wall of the bottom housing is a piece of interlock (31).
Figure 12D:
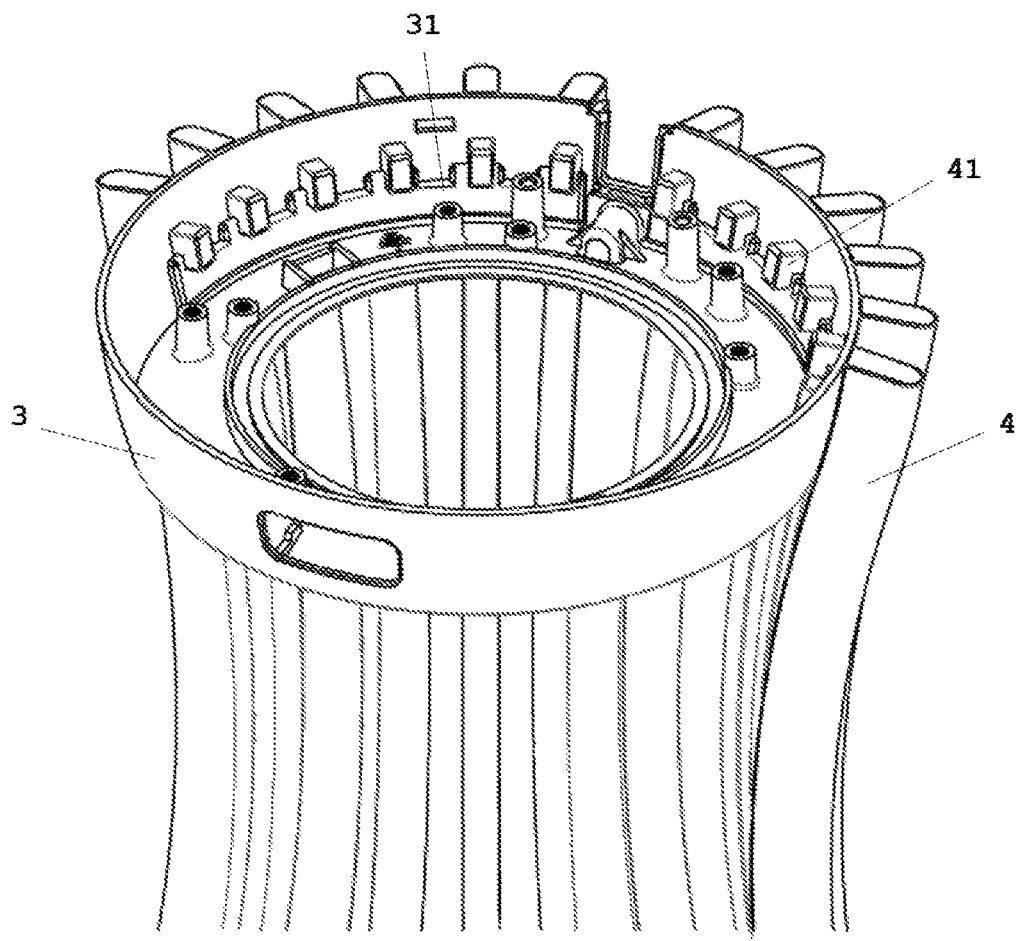
FIG. 12D shows the same interlocking system as in FIG. 12C in a locked position.

FIGS. 11A and B show a system (7) controlling water supply to the spout comprising a spout valve drive motor (71) for driving a spout valve cam (72) that pushes on a spout valve lever (73) to act on a spout valve body to control water flow.

Actions of the heating system, valve system and rotating spout system are closely correlated so that water to a specified temperature in the water tank will be promptly released into the coffee ground in a manner similar to manual pour over.

FIGS. 12A to D show how the plurality of connecting elements connects to the top housing and lower housing. Each top or bottom housing will have a plurality of holes corresponding to each of the plurality of connecting elements. Each connecting element will have a hook-like feature (41) to be inserted into each of the holes in the top or bottom housing. Within the top or bottom housing is a piece of interlock (21, 31) that can be moved to fit nicely into the space inside the hook (4) of the connecting elements to lock them in place. This design removes the need for using a mould for the housing so that it is cheaper and easier to produce. The type of materials that can be chosen for the housing can be easily varied, for example, wooden strips can be used as the plurality of connecting elements. This will not be possible with conventional coffee maker designs. Due to the spacing between each connecting element, light can shine through the housing into the carafe and a user can observe the brewing process clearly.

What is claimed is:

1. A coffee maker comprising
    a. a top housing (2) connected to a bottom housing (3) via a plurality of connecting elements (4) such that the top housing is enacted above the bottom housing;
    b. a water tank (1) positioned on top of the top housing;
    c. a carafe (5) to be placed under said top housing, said carafe comprises an upper part having a brewing cone (51); and
    d. a rotating spout (6) located at the bottom of said top housing and above said carafe for pouring hot water into said carafe;
    wherein the water tank comprises a heating system, a valve and a temperature sensor, wherein when said temperature sensor detects a specified temperature, said heating system is turned off and said valve is opened to allow hot water flowing via said rotating spout;
    wherein said valve is controlled by a gear system comprising a first cam and a second cam, the gear system rotates under the control of a motor gear system comprising a motor, a micro switch, and gears; wherein said temperature sensor is configured to turn the heating system on or off to keep water in said hot water chamber(s) at 92° C. to 96° C. and said motor gear system is configured to begin to rotate at the same time when the heating system is turned on or off to control opening or closing of said valve, the motor gear system is configured to stop rotating when the micro switch is hit by said first cam integrated in the gear system; wherein said valve is configured to open when said second cam integrated in the gear system activates a valve piston of said valve, and said water at 92° C. to 96° C. is configured to flow immediately from said water tank to the filter basket by gravity via the said rotating spout, said water configured to directly contact ground coffee to extract coffee beverage.

2. The coffee maker of claim 1, wherein the water tank is made of a transparent material.

3. The coffee maker of claim 1, wherein said rotating spout is driven by a motor when a temperature sensor detects a specified temperature in said water tank.

4. The coffee maker of claim 1, wherein said rotating spout is driven to rotate concentrically above said brewing cone.

5. The coffee maker of claim 1, wherein said rotating spout comprises an outlet which opens horizontally.

6. The coffee maker of claim 1, wherein said rotating spout comprises an outlet which opens diagonally.

7. The coffee maker of claim 1, wherein said bottom housing comprises a keep warm system.

8. The coffee maker of claim 1, wherein said plurality of connecting elements are made of wood, metal, glass, plastic, leather or die cast.

9. The coffee maker of claim 1, wherein said plurality of connecting elements are made of transparent material.

10. The coffee maker of claim 1, wherein said plurality of connecting elements are curved.

11. The coffee maker of claim 1, wherein said plurality of connecting elements are straight.

12. The coffee maker of claim 1, wherein said plurality of connecting elements are connected to said top housing and bottom housing by an interlock system.

13. The coffee maker of claim 12, wherein said interlock system comprises a hook-like feature (41) located on both ends of each of said plurality of connecting elements, a plurality of holes on said top housing and bottom housing corresponding to each of the plurality of connecting elements (4), and a piece of interlock (21) located adjacent to a wall of said top housing or bottom housing.

14. The coffee maker of claim 1, wherein said rotating spout is controlled by a mechanism comprising a rotate spout drive motor (61) driving a first rotate spout drive gear (62) which in turn drives a second rotate spout gear (63) to cause the spout to rotate.

15. The coffee maker of claim 1, comprising a system (7) controlling water supply to the rotating spout comprising a spout valve drive motor (71) for driving a spout valve cam (72) that pushes on a spout valve lever (73) to act on a spout valve body (74) to control water flow.

* * * * *